US008724637B2

(12) United States Patent
Liu et al.

(10) Patent No.: US 8,724,637 B2
(45) Date of Patent: May 13, 2014

(54) SYSTEM AND METHOD FOR MULTI-TOPOLOGY SUPPORT

(75) Inventors: Hua Autumn Liu, Santa Clara, CA (US); Huaimo Chen, Bolton, MA (US); Qianglin Quintin Zhao, Boxborough, MA (US)

(73) Assignee: FutureWei Technologies, Inc., Plano, TX (US)

( * ) Notice: Subject to any disclaimer, the term of this patent is extended or adjusted under 35 U.S.C. 154(b) by 122 days.

(21) Appl. No.: 12/476,054

(22) Filed: Jun. 1, 2009

(65) Prior Publication Data

US 2009/0303904 A1  Dec. 10, 2009

Related U.S. Application Data

(60) Provisional application No. 61/058,837, filed on Jun. 4, 2008.

(51) Int. Cl.
*H04L 12/28* (2006.01)

(52) U.S. Cl.
USPC ............ 370/395.5; 370/254; 370/395.4; 370/401; 709/246

(58) Field of Classification Search
USPC ............ 370/254, 351, 244, 390, 392, 395.4, 370/395.5, 395.53; 398/47; 709/246
See application file for complete search history.

(56) References Cited

U.S. PATENT DOCUMENTS

| 7,606,939 | B1 * | 10/2009 | Finn | 709/246 |
|---|---|---|---|---|
| 7,852,770 | B2 | 12/2010 | Xiao et al. | |
| 2003/0026250 | A1 * | 2/2003 | Fang | 370/386 |
| 2003/0037276 | A1 * | 2/2003 | Mo et al. | 714/4 |
| 2003/0137971 | A1 * | 7/2003 | Gibson et al. | 370/351 |
| 2005/0105905 | A1 * | 5/2005 | Ovadia et al. | 398/47 |
| 2005/0188100 | A1 * | 8/2005 | Le Roux et al. | 709/238 |
| 2006/0117110 | A1 | 6/2006 | Vasseur et al. | |
| 2007/0030846 | A1 | 2/2007 | Szczesniak et al. | |
| 2007/0127474 | A1 * | 6/2007 | Mirtorabi et al. | 370/390 |
| 2007/0230358 | A1 * | 10/2007 | Narayanan et al. | 370/244 |
| 2008/0049622 | A1 | 2/2008 | Previdi et al. | |
| 2009/0201932 | A1 | 8/2009 | Kumar et al. | |
| 2010/0074101 | A1 * | 3/2010 | Skalecki et al. | 370/221 |

FOREIGN PATENT DOCUMENTS

| CN | 101036134 A | 9/2007 |
|---|---|---|
| CN | 101087221 A | 12/2007 |
| CN | 101136844 A | 3/2008 |
| JP | 2008-054151 A | 3/2008 |
| WO | WO 02/087175 A1 | 10/2002 |
| WO | WO 2009/146656 A1 | 12/2009 |

OTHER PUBLICATIONS

Senevirathne, T, Distribution of 802.1Q VLAN information using BGP 4-MP Extension, IETF, Nov. 2000.*

(Continued)

*Primary Examiner* — Charles C Jiang
*Assistant Examiner* — Mohamed Kamara
(74) *Attorney, Agent, or Firm* — Slater & Matsil, L.L.P.

(57) ABSTRACT

A system and method for providing multi-topology support in RSVP-TE in a multi-protocol label switching network is provided. A method includes reserving path states for a traffic engineered label switched path (TE LSP), and releasing the reserved path states. The TE LSP is established within a single network topology in an environment of multiple network topologies, and the reserving path states includes sending a first resource reservation protocol with traffic engineering (RSVP-TE) message containing multi-topology information.

22 Claims, 6 Drawing Sheets

(56) References Cited

OTHER PUBLICATIONS

Kikuta, K et al, Point-to-Multipoint VLAN path signalling demonstration on a GMPLS controlled Ethernet test network, Keio University, 2010.*

Awduche, D., et al., "RSVP-TE: Extensions to RSVP for LSP Tunnels," RFC 3209, Dec. 2001, pp. 1-61.

Rosen, E., et al., "Multiprotocol Label Switching Architecture,"RFC 3031, Jan. 2001, pp. 1-61.

Przygienda, T., et al., "M-ISIS: Multi Topology (MT) Routing in Intermediate System to Intermediate Systems (IS-ISs)," RFC 5120, Feb. 2008, pp. 1-14.

Psenak, P., et al., "Multi-Topology (MT) Routing in OSPF," RFC 4915, Jun. 2007, pp. 1-20.

"Notification of Transmittal of the International Search Report and the Written Opinion of the International Searching Authority, or the Declaration," International Application No. PCT/CN2009/072131, Applicant: Huawei Technologies Co., Ltd., et al., Aug. 27, 2009, 12 pages.

"Extended European Search Report," Application No. 09757090.7-1249, Applicant: Huawei Technologies Co., Ltd., Dec. 22, 2010, 7 pages.

Braden, R., et al., "Resource ReSerVation Protocol (RSVP): Version 1 Functional Specification," Network Working Group, Sep. 1997, pp. 1-112.

European Search Report mailed Oct. 13, 2011; International Application No. 09757090.7; 5 pages.

Japanese Office Action with English translation received in Japanese Patent Application No. 2011-505356, mailed Jun. 5, 2012, 2 pages.

First Chinese Office Action of Chinese Application No. 200980118479.6 and Partial Translation, mailed on Nov. 27, 2012, 27 pages.

European Office Action received in European Application No. 09757090.7 dated May 7, 2013, 5 pages.

* cited by examiner

SYSTEM AND METHOD FOR MULTI-TOPOLOGY SUPPORT

This application claims the benefit of U.S. Provisional Application No. 61/058,837, filed on Jun. 4, 2008, entitled "System and Method For Multi-Topology Support in Resource Reservation Protocol—Traffic Engineering of Multi-Protocol Label Switching Network," which application is hereby incorporated herein by reference.

TECHNICAL FIELD

The present invention relates generally to communications, and more particularly to a system and method for providing multi-topology support in RSVP-TE in a multi-protocol label switching network.

BACKGROUND

In Multi-protocol Label Switching (MPLS) networks, a label may be assigned to represent a set of Forwarding Equivalent Classes (FEC) of packets and a mapping of the label and the FEC may be signaled along the path traversed by the packets. Therefore, the label switched paths are established to forward packets.

Resource reservation protocol (RSVP) is a network control protocol that may be used to enable applications to obtain different quality of service (QoS) for their data flows. However, RSVP is not a routing protocol. Rather, RSVP operates in conjunction with routing protocols.

Resource reservation protocol-traffic engineering (RSVP-TE) is an extension to RSVP that supports resource reservations across an Internet Protocol (IP) network. Generally, RSVP-TE may be used to establish MPLS label switched paths (LSPs) with or without resource reservations, with consideration given to available bandwidth and a number of explicit hops. The LSPs may be setup using explicit routes. A variety of messages and procedures may be used by network elements to inform other network elements of the labels used for MPLS forwarding. The LSPs may be treated as a tunnel, which is tunneling below normal IP routing and filtering mechanisms.

A mechanism for Open Shortest Path First (OSPF) protocol to support multi-topologies (MT) in IP networks, wherein Type of Service (TOS) based metric fields are redefined and used to advertise different topologies is disclosed in P. Psenak, et. al., "Multi-Topology (MT) Routing in OSF," RFC 4915, June 2007, which is incorporated herein by reference. Separate metrics may be associated for each TOS and may be advertised via protocol information exchange between network elements. The existing OSPF protocol is extended to support network topology changes with Multi-Topology Identifier (MT-ID). Multi-topology information comprises a multi-topology identification and a multi-topology identification metric.

A mechanism within Intermediate System to Intermediate System (IS-IS) to run a set of independent IP topologies for each network topology is disclosed in T. Przygienda, et. al., "M-ISIS: Multi Topology (MT) Routing in Intermediate System to Intermediate Systems (IS-ISs), RFC 5120, February 2008, which is incorporated herein by reference. The existing IS-IS protocol is extended so that advertisements of adjacencies and reachable intermediate system within each topology are performed.

Therefore, there is a need to have systems and methods for supporting multi-topology in MPLS network and extending the RSVP-TE protocol as a signaling protocol in the MPLS network to establish and maintain traffic engineered LSP tunnel within each network topology or across network topologies. The LSP tunnel may need to follow a specific path or to reserve a certain amount of bandwidth to satisfy QoS requirements for the traffic flowing through the LSP tunnel within a specific network topology in an environment of multiple network topologies.

SUMMARY OF THE INVENTION

These technical advantages are generally achieved, by embodiments of a system and method for providing multi-topology support in RSVP-TE in a multi-protocol label switching network.

In accordance with an embodiment, a method for sender node operation is provided. The method includes reserving path states for a traffic engineered label switched path (TE LSP), and releasing the reserved path states. The TE LSP is established within a single network topology in an environment of multiple network topologies, and the reserving path states includes sending a first resource reservation protocol with traffic engineering (RSVP-TE) message containing multi-topology information.

In accordance with another embodiment, a method of receiver node operation is provided. The method includes receiving a first resource reservation protocol with traffic engineering (RSVP-TE) message containing multi-topology information from a sender node or a transit router, reserving reservation states for the TE LSP, and releasing the reserved reservation states. The first RSVP-TE message reserving path states for a traffic engineered label switched path (TE LSP), and the TE LSP is established within a single network topology in an environment of multiple network topologies. The reserving reservation states includes sending a second RSVP-TE message containing multi-topology information. The second RSVP-TE message travels a reverse path identical to a forward path traveled by the first RSVP-TE message.

In accordance with another embodiment, a multi-topology, multi-protocol label switching (MPLS) network using resource reservation protocol with traffic engineering (RSVP-TE) is provided. The MPLS network includes a plurality of network elements coupled together with a number of links, the plurality of network elements arranged into two or more network topologies. Each network element includes a session manager that establishes traffic engineered label switched paths (TE LSPs). The RSVP-TE is used to establish TE LSPs, and each TE LSP is established within a single network topology.

An advantage of an embodiment is that multi-topology is supported in RSVP-TE MPLS. The use of multi-topology may enable enhanced performance in RSVP-TE.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a MPLS network with extended RSVP-TE to provide support for multi-topology.

Figure 1:
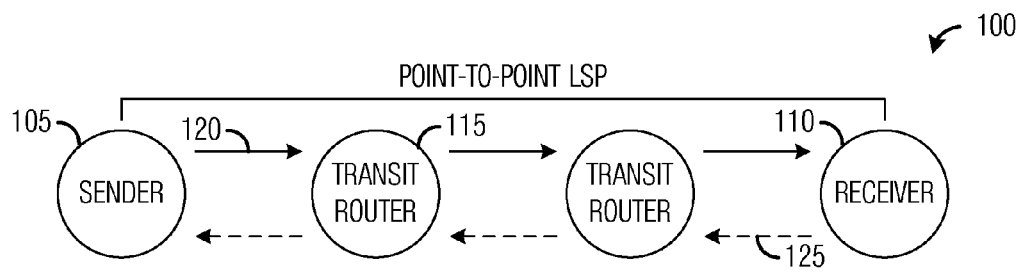
FIG. 1 is a diagram of a RSVP session.

FIG. 1 illustrates a RSVP session 100. As shown in FIG. 1, RSVP session 100 includes a sender (also referred to as an ingress router) 105 and a receiver 110 at a session address. Depending upon a separation between sender 105 and receiver 110, there may be any number of transit routers, such as transit router 115 located between sender 105 and receiver 110. Solid arrowed lines, such as arrowed line 120, represent downstream data flow and dashed arrowed lines, such as arrowed line 125, represent upstream data flow.

RSVP session 100 may progress as follows: 1) A potential sender (sender 105) starts sending RSVP Path messages to transit router 115 along the solid arrow line 120; 2) A receiver 110 receives the RSVP Path messages from a transit router; 3) Receiver 110 sends RSVP Resv messages to the transit router along the dashed arrow line 125, where the RSVP Resv messages carry a flow descriptor used by routers along the path to make reservations in their link-layer media; and 4) Sender 105 receives the RSVP Resv messages from transit router 115, which completes the establishing of a LSP to receiver 110, and starts sending application data.

Figure 2A:
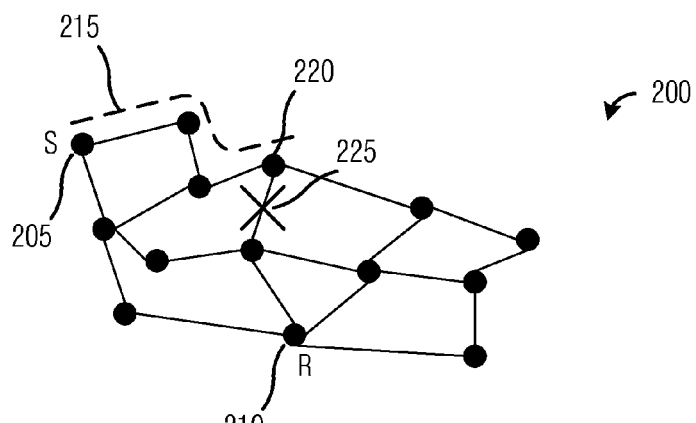
FIG. 2a is a diagram of a network.

FIG. 2a illustrates a network 200. Network 200 includes a number of nodes, such as node 205 and node 210. Network 200 is connected by links in a mesh topology. Node 205 may be a sender node and node 210 may be a receiver node. Messages from node 205 to node 210 may follow a path shown as dashed line 215. However, path 215 stops at node 220 since there may be a fault on link 225.

Figure 2B:
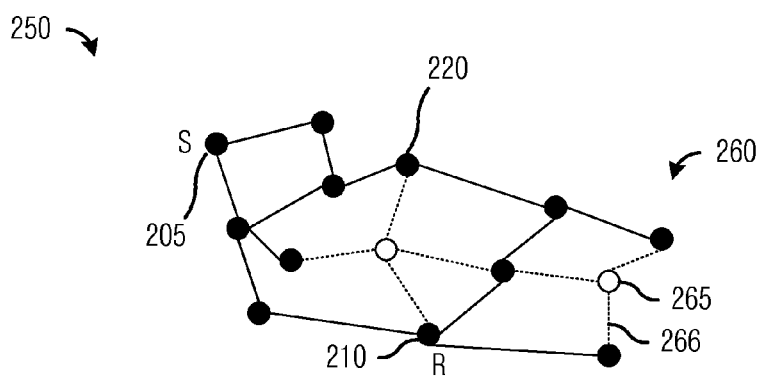
FIG. 2b is a diagram of a network supporting multi-topology.
Figure 2B:
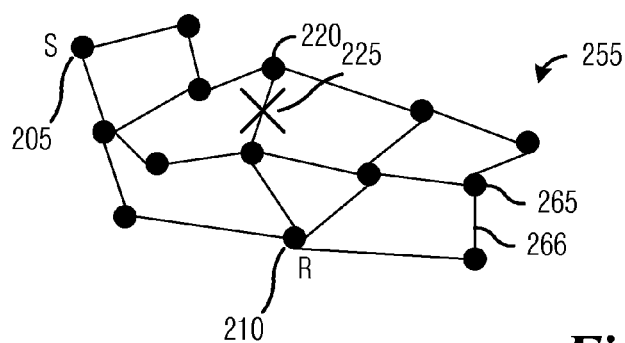

FIG. 2b illustrates a network 250. Network 250 includes the same number and arrangement of nodes and links as network 200. However, network 250 is a multi-topology network that comprises a first network 255 and a second network 260. First network 255 may be arranged in a mesh exactly like network 200. Second network 260 may have fewer nodes and links than first network 255. For example, node 265 in second network 260 is shown in FIG. 2b as a hollow circle indicating its absence from second network 260. Similarly, link 266 is shown as a dotted line indicating its absence from second network. However, node 265 and link 266 are both present in first network 255. Although a link/node is absent in one network, it may be present in another network.

Figure 3A:
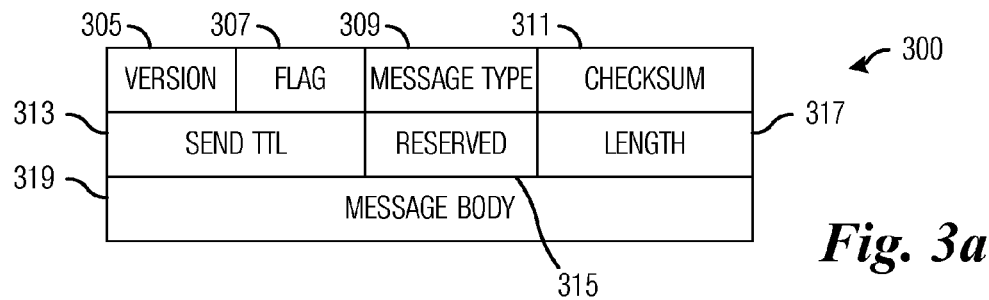
FIG. 3a is a diagram of a format of a RSVP message.
Figure 3B:
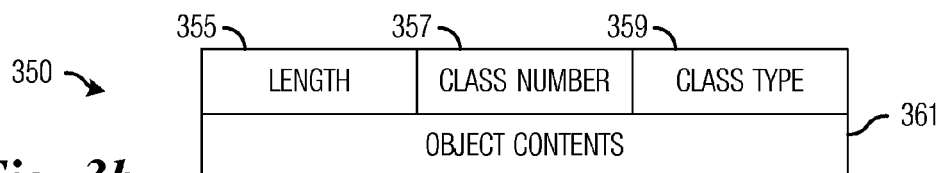
FIG. 3b is a diagram of a format of a RSVP object.

FIGS. 3a and 3b illustrate the format of a RSVP-TE message 300 and a RSVP-TE object 350. RSVP-TE message 300 includes a version field 305, a flag field 307, a message type field 309, a checksum field 311, a send time to live (TTL) field 313, a reserved field 315, a length field 317, and a message body field 319. Version field 305 may specify a version of the RSVP-TE, flag field 307 may be used to signal support for protocol extensions to neighboring routers, checksum field 311 may be used to contain a checksum for the entire RSVP-TE message, TTL field 313 may be used to contain a send time to live value, reserved field 315 is currently not used, length field 317 may be used to contain a value indicating the length of the RSVP-TE message, and message body field 319 may be a variable length field used to contain one or more RSVP-TE objects.

Message type field 309 may be used to specify the type of RSVP-TE message. There may be a number of message types, including but not limited to:

1 Path—Sent by sender nodes downstream to store path state at each node along a traffic engineered label switched path (TE LSP), 2 Resv—Sent by receiver nodes upstream over a TE LSP to be used by data traffic to create reservation states at each node along the TE LSP, 3 PathErr—Sent by receiver nodes upstream to indicate the occurrence of errors while processing a Path message, 4 ResvErr—Sent by sender nodes downstream to indicate the occurrence of errors while processing a Resv message, 5 PathTear—Sent by sender nodes downstream to remove path states along a TE LSP, 6 ResvTear—Sent by receiver nodes upstream to remove reservation states along a TE LSP, and 7 ResvConf—Sent by sender nodes downstream to confirm that reservations have been made.

RSVP-TE object 350 includes a length field 355, a class number field 357, a class type field 359, and an objects contents field 361. Length field 355 may be used to contain a length of the RSVP-TE object, class number field 357 may be used to identify object class, class type field 359 may be used to contain a value that is unique to object class identified in class number field 357, and object contents field 361 may be used to contain data identified in class number field 357 and class type field 359.

Examples of RSVP-TE objects include, but are not limited to:

Session Object—Defines a specific session for objects that follow,

Sender Template Object—Defines format of sender data,

Record Route Object—Indicates a list of addresses transited by Path or Resv message, Explicit Route Object—Specifies a strict or loose path in network topology, and RSVP Hop Object—Carries address of RSVP-TE capable node sending a message. The sender template object, record route object, explicit route object, RSVP hop object, and other objects not mentioned herein may be child objects of the session object. As such, a session object is always present when one of its children objects are present in a RSVP-TE message.

Additional information, such as multi-topology (MT) information may be added to a RSVP-TE message or a RSVP-TE object to enable multi-topology signaling in a RSVP-TE MPLS network.

Figure 4A:
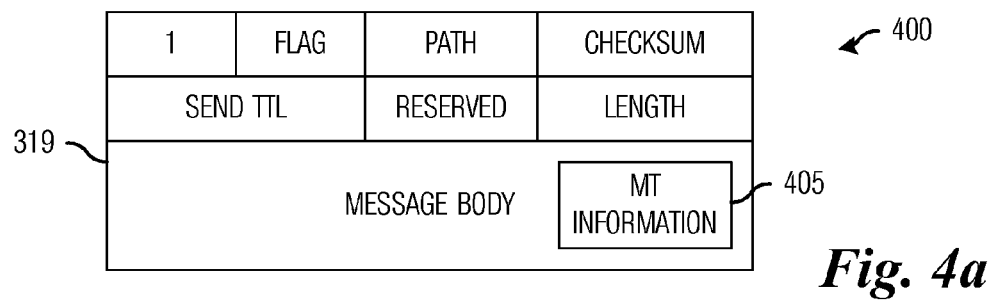
FIG. 4a is a diagram of a format of an extended Path message containing MT information.

FIG. 4a illustrates a format of an extended Path message 400. A sender node may reserve path states by sending extended Path message 400 to one or more receiver nodes using unicast or multi-cast routing. Extended Path message 400 may contain MT information 405 in its message body field 319. MT information 405 may be used to indicate the network topology a TE LSP is traversing. MT information 405 may also be used to label the reserved path states, indicating the network topology of the session, and so forth.

Figure 4B:
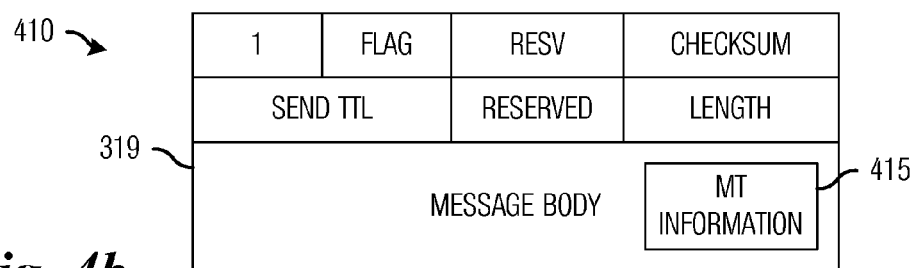
FIG. 4b is a diagram of a format of an extended Resv message containing MT information.

FIG. 4b illustrates a format of an extended Resv message 410. After receiving an extended Path message, a receiver node may reserve reservation states by sending extended Resv message 410 back to the sender node over the same TE LSP as taken by the extended Path message. Extended Resv message 410 may contain MT information 415 in its message body field 319. MT information 415 may be used to indicate the network topology the TE LSP is traversing. MT information 415 may be used to label the reserved reservation states, indicating the network topology of the session, and so on.

Figure 4C:
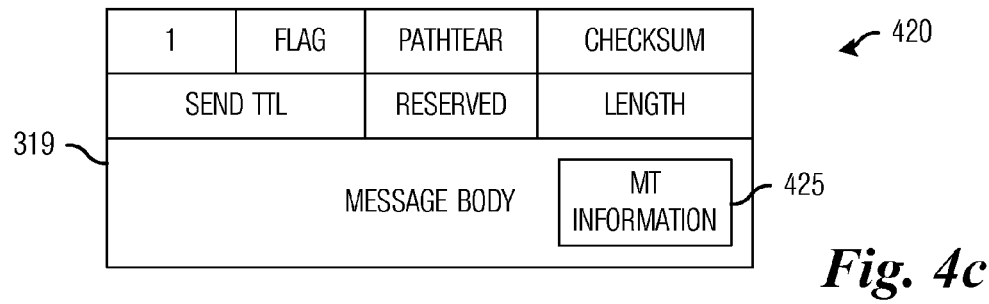
FIG. 4c is a diagram of a format of an extended PathTear message containing MT information.

FIG. 4c illustrates a format of an extended PathTear message 420. Once a TE LSP is no longer needed, the sender node may tear down the TE LSP and release the path states. The sender node may send extended PathTear message 420 to network elements in the TE LSP. Extended PathTear message 420 may result in the release of path states at network elements in the TE LSP. Extended PathTear message 420 may include MT information 425 in its message body field 319. MT information 425 may be used to indicate which network topology the TE LSP being torn down belongs to.

Figure 4D:
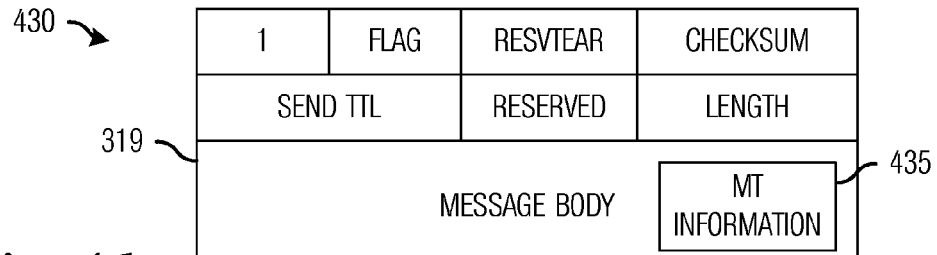
FIG. 4d is a diagram of a format of an extended ResvTear message containing MT information.

FIG. 4d illustrates a format of an extended ResvTear message 430. Once a TE LSP is no longer needed, the receiver node may tear down the TE LSP and release the reservation states. The receiver node may send extended ResvTear message 430 to network elements in the TE LSP. Extended ResvTear message 430 may result in the release of reservation states at network elements in the TE LSP. Extended ResvTear message 430 may include MT information 435 in its message body field 319. MT information 435 may be used to indicate which network topology the TE LSP being torn down belongs to.

Figure 4E:
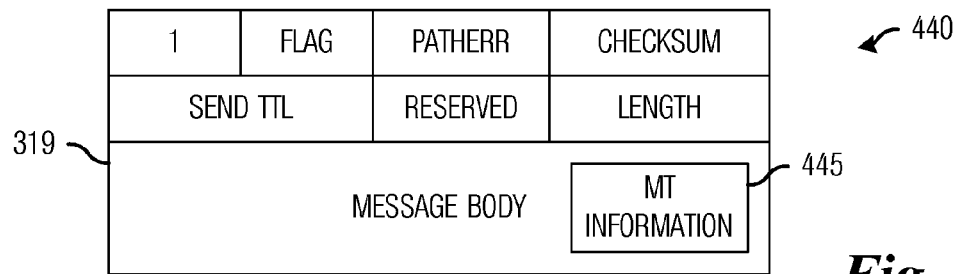
FIG. 4e is a diagram of a format of an extended PathErr message containing MT information.

FIG. 4e illustrates a format of an extended PathErr message 440. The receiver node may inform network elements about the status of reservation states by sending extended PathErr message 440 message to network elements in the TE LSP of an extended Path message to indicate that an error has occurred with the extended Path message. Extended PathErr message 440 may contain MT information 445 in its message body field 319. MT information 445 may be used to indicate the network topology the TE LSP is traversing.

Figure 4F:
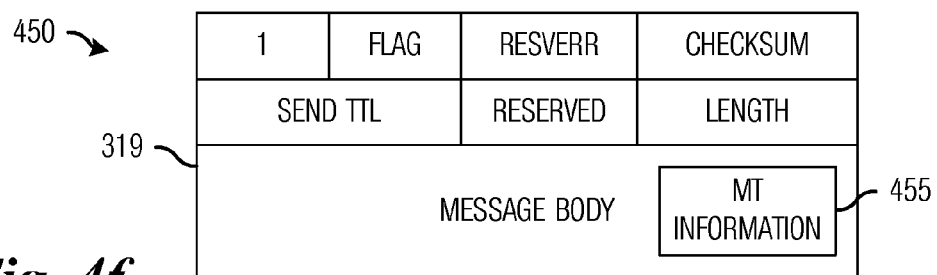
FIG. 4f is a diagram of a format of an extended ResvErr message containing MT information.

FIG. 4f illustrates a format of an extended ResvErr message 450. After receiving an extended Resv message, the sender node may send extended ResvErr message 450 to network elements in a TE LSP of the extended Resv message to indicate that an error has occurred with the extended Resv message. Extended ResvErr message 450 may contain MT information 455 in its message body field 319. MT information 455 may be used to indicate the network topology the TE LSP is traversing.

Figure 4G:
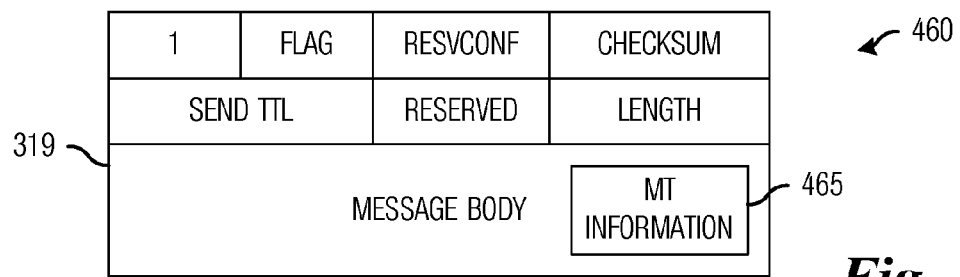
FIG. 4g is a diagram of a format of an extended ResvConf message containing MT information.

FIG. 4g illustrates a format of an extended ResvConf message 460. After receiving an extended Resv message, the sender node may send extended ResvConf message 460 to network elements in the TE LSP of the extended Resv message to confirm that reservation of reservation states have been made. Extended ResvConf message 460 may contain MT information 465 in its message body field 319. MT information 465 may be used to indicate the network topology the TE LSP is traversing.

RSVP-TE objects may be utilized to indicate MT information by adding the multi-topology information in an RSVP-TE object carried in a RSVP-TE message. A preferred RSVP-TE object may be a session object. However, a number of child objects of the session object may also be used. Exemplary child objects include sender template object, record route object, explicit route object, RSVP hop object, and so forth.

Figure 5A:
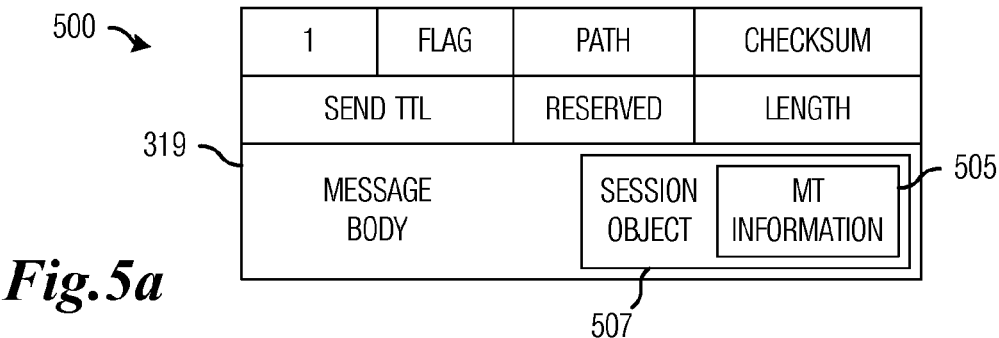
FIG. 5a is a diagram of a format of an extended Path message with a RSVP session object containing MT information.

FIG. 5a illustrates a format of an extended Path message 500. A sender node may reserve path states by sending extended Path message 500 to one or more receiver nodes using unicast or multi-cast routing. Extended Path message 500 may contain MT information 505 in its session object 507 contained in its message body field 319. MT information 505 may be used to indicate the network topology a TE LSP is traversing. MT information 505 may be used to label the reserved path states, indicating the network topology of the session, and so forth. MT information 505 may also be used to indicate the network topologies which the sender node of the TE LSP participates.

Figure 5B:
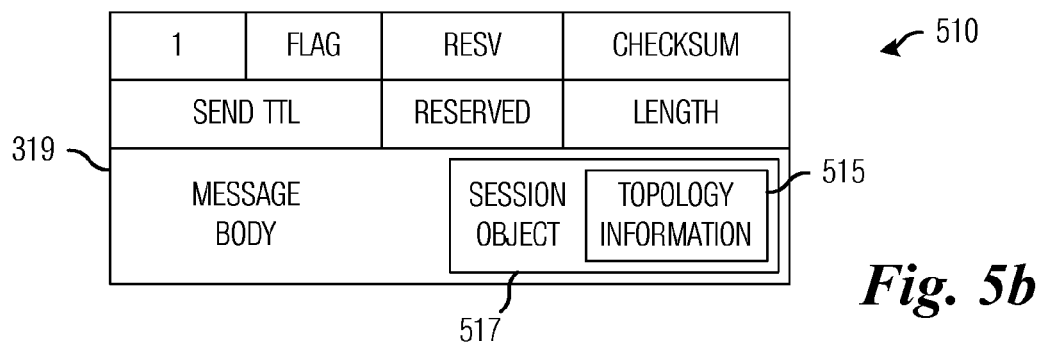
FIG. 5b is a diagram of a format of an extended Resv message with a RSVP session object containing MT information.

FIG. 5b illustrates a format of an extended Resv message 510. After receiving an extended Path message, a receiver node may reserve reservation states by sending extended Resv message 510 back to the sender node over the same TE LSP as taken by the extended Path message. Extended Resv message 510 may contain MT information 515 in its session object 517 contained in its message body field 319. MT information 515 may be used to indicate the network topology the TE LSP is traversing. MT information 515 may be used to label the reserved reservation states, indicating the network topology of the session, and so on. MT information 515 may also be used to indicate the network topologies which the receiver node of the TE LSP participates.

Figure 5C:
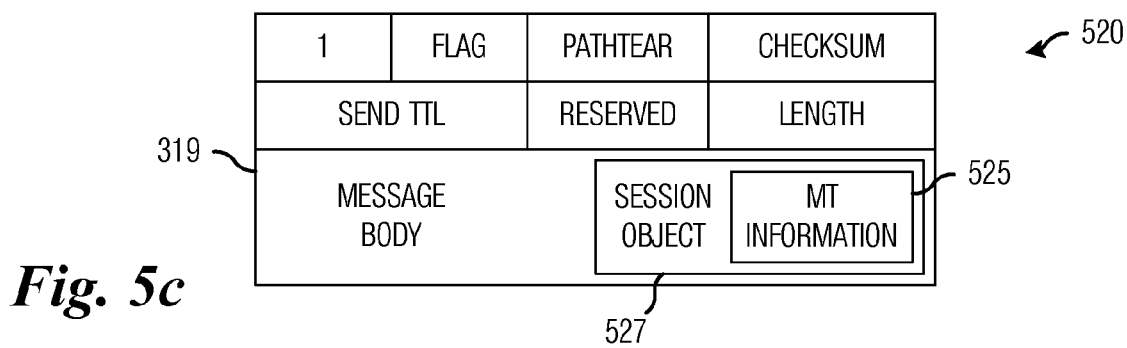
FIG. 5c is a diagram of a format of an extended PathTear message with a RSVP session object containing MT information.

FIG. 5c illustrates a format of an extended PathTear message 520. Once a TE LSP is no longer needed, the sender node may tear down the TE LSP and release the path states. The sender node may send extended PathTear message 520 to network elements in the TE LSP. Extended PathTear message 520 may result in the release of path states at network elements in the TE LSP. Extended PathTear message 520 may include MT information 525 in its session object 527 contained in its message body field 319. MT information 525 may be used to indicate which network topology the sender node of the TE LSP being torn down belongs to.

Figure 5D:
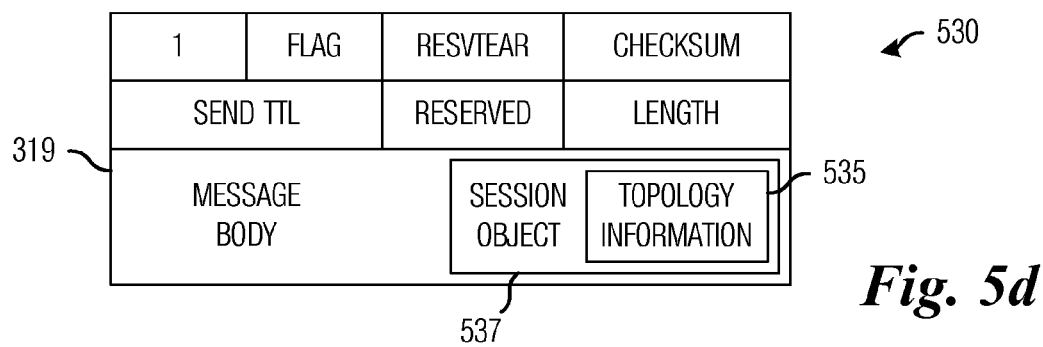
FIG. 5d is a diagram of a format of an extended ResvTear message with a RSVP session object containing MT information.

FIG. 5d illustrates a format of an extended ResvTear message 530. Once a TE LSP is no longer needed, the receiver node may tear down the TE LSP and release the reservation states. The receiver node may send extended ResvTear message 530 to network elements in the TE LSP. Extended ResvTear message 530 may result in the release of reservation states at network elements in the TE LSP. Extended ResvTear message 530 may include MT information 535 in its session object 537 contained in its message body field 319. MT information 535 may be used to indicate which network topology the receiver node of the TE LSP being torn down belongs to.

Figure 5E:
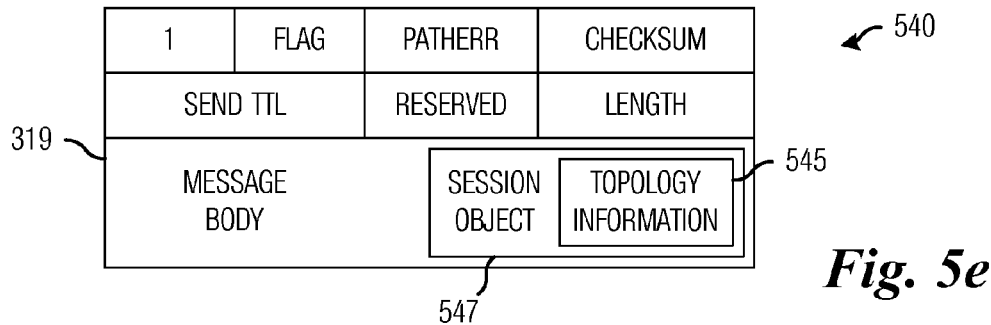
FIG. 5e is a diagram of a format of an extended PathErr message with a RSVP session object containing MT information.

FIG. 5e illustrates a format of an extended PathErr message 540. The receiver node may inform network elements about the status of reservation states by sending extended PathErr message 540 message to network elements in the TE LSP of an extended Path message to indicate that an error has occurred with the extended Path message. Extended PathErr message 540 may contain MT information 545 in its session object 547 contained in its message body field 319. MT information 545 may be used to indicate the network topology the sender node and the receiver node belongs to.

Figure 5F:
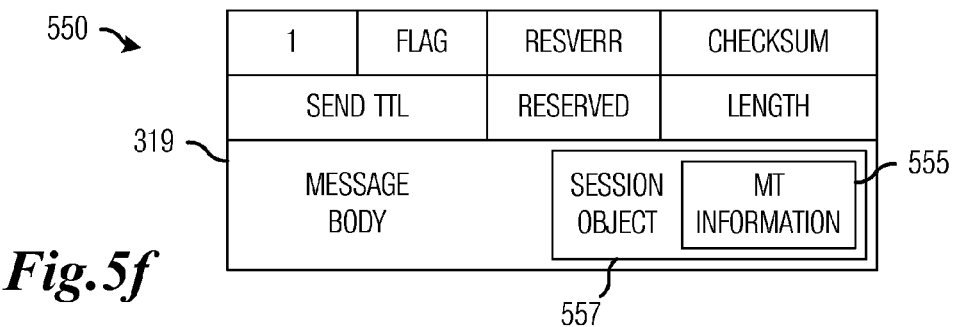
FIG. 5f is a diagram of a format of an extended ResvErr message with a RSVP session object containing MT information.

FIG. 5f illustrates a format of an extended ResvErr message 550. After receiving an extended Resv message, the sender node may send extended ResvErr message 550 to network elements in a TE LSP of the extended Resv message to indicate that an error has occurred with the extended Resv message. Extended ResvErr message 550 may contain MT information 555 in its session object 557 contained in its message body field 319. MT information 555 may be used to indicate the network topology the sender node and the receiver node belongs to.

Figure 5G:
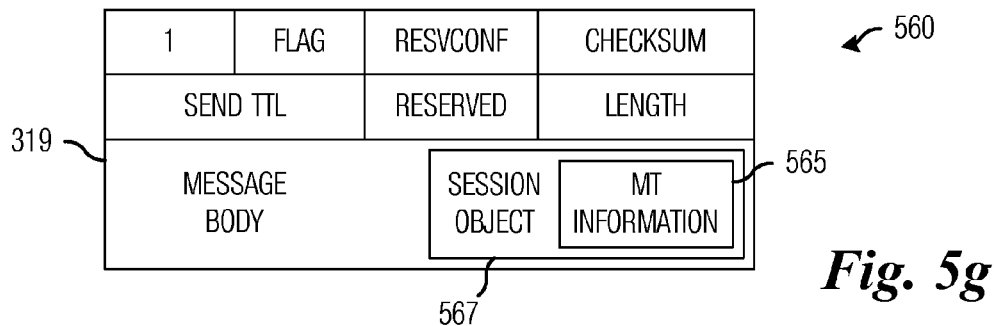
FIG. 5g is a diagram of a format of an extended ResvConf message with a RSVP session object containing MT information.

FIG. 5g illustrates a format of an extended ResvConf message 560. After receiving an extended Resv message, the sender node may send extended ResvConf message 560 to network elements in the TE LSP of the extended Resv message to confirm that reservation of reservation states have been made. Extended ResvConf message 560 may contain MT information 565 in its session object 567 contained in its message body field 319. MT information 565 may be used to indicate the network topology the sender node and the receiver node belongs to.

Figure 6A:
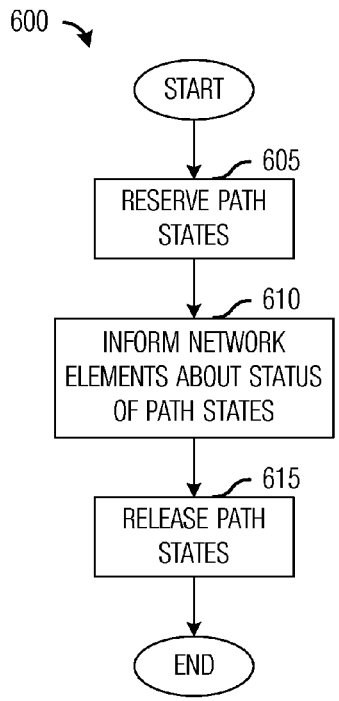
FIG. 6a is a flow diagram of sender node operations in a multi-topology RSVP-TE MPLS network.

FIG. 6a illustrates a flow diagram of sender node (or router) operation 600 in a multi-topology RSVP-TE MPLS network. Sender node operation 600 may be indicative of operations taking place in a sender node as it initiates a session (a TE LSP), maintains the session, and then tears down the session in the multi-topology RSVP-TE MPLS network. In a multi-topology RSVP-TE MPLS network, a session may be created within a single network topology in an environment of multiple network topologies.

When a session is to be created, it may be possible to indicate MT information by adding the MT information in a message body or a session object of an RSVP-TE message. Sender node operation 600 may begin with a sender node reserving path states (block 605). The sender node may reserve path states by sending an extended Path message to one or more receiver nodes using unicast or multi-cast routing. The extended Path message may contain MT information in its message body field or in a session object contained in the message body field.

The sender node may also inform network elements about the status of path states (block 610). The sender node may use a variety of message types to inform network elements about the status of path states. For example, the sender node may send an extended ResvErr message to network elements in a TE LSP of a Resv message to indicate that an error has occurred with the Resv message. Additionally, the sender node may send an extended ResvConf message to network elements in the TE LSP of the Resv message to confirm that reservation of reservation states have been made. Both the ResvErr and ResvConf messages may contain MT information in its message body field or in session objects contained in its message body field.

Once the session is no longer needed, the sender node may tear down the TE LSP and release the path states. The sender node may send an extended PathTear message to network elements in the TE LSP (block 615). The extended PathTear message may result in the release of path states at network elements in the TE LSP. The extended PathTear message may contain MT information in its message body field or in session objects contained in its message body field. Once the sender node tears down the TE LSP and releases the path states, sender node operation 600 may terminate.

Figure 6B:
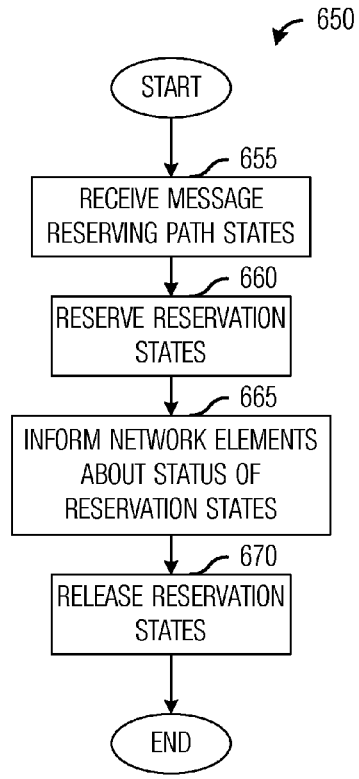
FIG. 6b is a flow diagram of receiver node operations in a multi-topology RSVP-TE MPLS network.

FIG. 6b illustrates a flow diagram of receiver node (or router) operation 650 in a multi-topology RSVP-TE MPLS network. Receiver node operation 650 may be indicative of operations taking place in a receiver node as it initiates a session (a TE LSP), maintains the session, and then tears down the session in the multi-topology RSVP-TE MPLS network. In a multi-topology RSVP-TE MPLS network, a session may be created within a single network topology in an environment of multiple network topologies.

When a session is to be created, it may be possible to indicate MT information by adding the MT information in message body or a session object of an RSVP-TE message. Receiver node operation 650 may begin with a receiver node receiving a message from a sender node, the message reserving path states (block 655). The message may be an extended Path message that may contain MT information regarding the multi-topology nature of the TE LSP being established. For example, the TE LSP may be within a single network topology in an environment of multiple network topologies.

The receiver node may then begin to reserve reservation states (block 660). The receiver node may reserve reservation states by sending an extended Resv message back to the sender node over the same TE LSP as taken by a corresponding extended Path message. The Resv message may contain MT information in its message body field or in a session object contained in the message body field.

The receiver node may also inform network elements about the status of reservation states (block 665). The receiver node may send an extended PathErr message to network elements in a TE LSP of the extended Path message to indicate that an error has occurred with the extended Path message. The extended PathErr message may contain MT information in its message body field or in a session object contained in the message body field.

Once the session is no longer needed, the receiver node may tear down the TE LSP and release the reservation states. The receiver node may send an extended ResvTear message to network elements in the TE LSP (block 670). The extended ResvTear message may result in the release of reservation states at network elements in the TE LSP. The extended ResvTear message may contain MT information in its message body field or in a session object contained in the message body field. Once the receiver node tears down the TE LSP and releases the reservation states, receiver node operation 650 may terminate.

Figure 7:
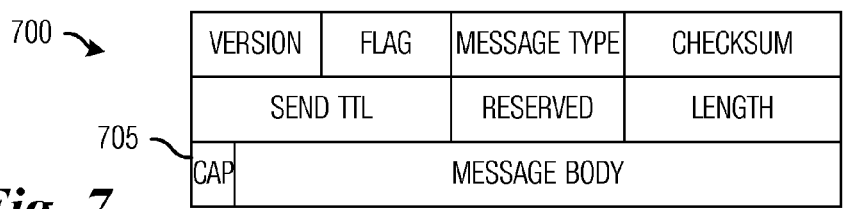
FIG. 7 is a diagram of a format of an extended RSVP message.

In addition to adding MT information to a RSVP-TE message or a RSVP-TE object, it may also be possible to add an indication that indicates if a network element is capable of supporting multi-topology. FIG. 7 illustrates a format of an extended RSVP-TE message 700. Extended RSVP-TE message 700 includes fields present in a normal RSVP-TE message, such as RSVP-TE message 300 (FIG. 3*a*), such as a version field, a flag field, a message type field, a checksum field, a send TTL field, a reserved field, a length field, and a message body field. Extended RSVP-TE message 700 also includes a capability field 705. Capability field 705 may be used to contain an indication of the multi-topology capability of a network element. For example, if capability field 705 contains an indication with a first defined value, true, for example, then the network element is able to support multi-topology. However, if capability field 705 contains an indication with a second defined value, such as false, for example, then the network element is not able to support multi-topology.

The indication contained in the capability field may be used as follows: If a network element in a TE LSP of a network element sending a Path message, Resv message, or so forth, is not capable of supporting multi-topology, then the network element may send future RSVP-TE messages without MT information. Conversely, if the network element is capable of supporting multi-topology, then the network element may send future RSVP-TE messages with MT information.

Figure 8:
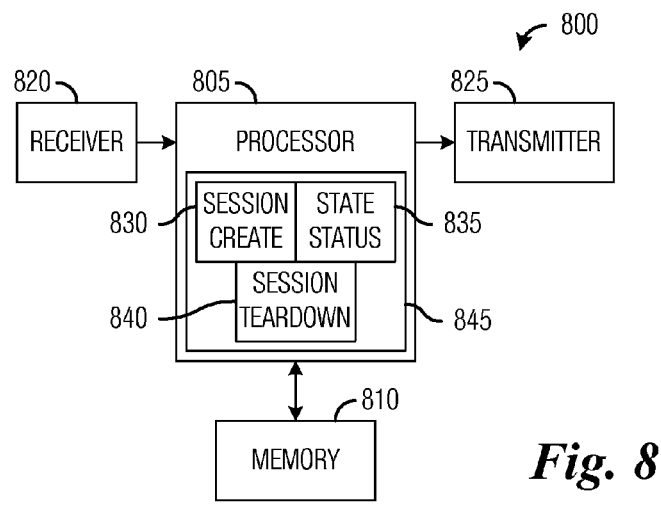
FIG. 8 is a diagram of a network element.

FIG. 8 illustrates a network element 800. Network element 800 may be suitable for implementing one or more of the embodiments disclosed herein. Network element 800 includes a processor 805, which may be referred to as a central processing unit (CPU), which is communicating with memory devices, including a memory 810 for storing path states, reservation states, labels, MT information, as well as other session variables and parameters. Processor 805 may also be communicating with other network elements through a receiver 820 and a transmitter 825. Receiver 820 and/or transmitter 825 may be wireless, wired, or a combination of both wireless and wired receivers and/or transmitters.

Processor 805 includes a session create unit 830, a state status unit 835, and a session teardown unit 840. Session create unit 830, state status unit 835, and session teardown unit 840 may be a part of a session manager 845. Session create unit 830 may be used to create a session (a TE LSP, for example) within a network topology in an environment of multiple network topologies. Session create unit 830 may use an extended Path message or an extended Resv message that includes MT information or objects that include MT information to reserve path states or reservation states. State status unit 835 may be used to provide session status to network elements. State status unit 835 may use extended ResvErr, ResvConf, or PathErr messages that includes MT information or objects that include MT information to provide state status information. Session teardown unit 840 may be used to teardown a session and release network resources once the session is no longer being used. Session teardown unit 840 may use extended PathTear or ResvTear messages that include MT information or objects that include MT information to teardown sessions and release network resources.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for sender node operation, the method comprising:
    selecting a single network topology from an environment of multiple network topologies in a single network, wherein the single network topology comprises multiple potential paths to a receiver node, and wherein multiple network elements are shared between at least two of the multiple network topologies;
    reserving path states for a traffic engineered label switched path (TE LSP) at layer two, wherein the TE LSP is established within the single network topology, and wherein reserving path states comprises sending a first resource reservation protocol with traffic engineering (RSVP-TE) message at layer two containing multi-topology information comprising a multi-topology identification and a multi-topology identification metric about the single network topology traversed by the TE LSP at layer two among the multiple network topologies in the single network; and
    releasing the reserved path states.

2. The method of claim 1, further comprising providing path state information to network elements.

3. The method of claim 1, wherein the first RSVP-TE message comprises a RSVP-TE Path message.

4. The method of claim 3, wherein the multi-topology information is contained within a RSVP-TE object in the RSVP-TE Path message.

5. The method of claim 1, wherein the first RSVP-TE message comprises a capability field, wherein the capability field contains an indicator that indicates if an originator of a message is capable of supporting multi-topology networks.

6. The method of claim 1, wherein releasing the reserved path states comprises sending a second RSVP-TE message containing the multi-topology information.

7. The method of claim 6, wherein the second RSVP-TE message comprises a RSVP-TE PathTear message.

8. A method of receiver node operation, the method comprising:
    receiving a first resource reservation protocol with traffic engineering (RSVP-TE) message at layer two containing multi-topology information from a sender node or a transit router, the first RSVP-TE message reserving path states for a traffic engineered label switched path (TE LSP) at layer two, wherein the TE LSP is established within a single network topology in an environment of multiple network topologies in a single network, wherein the single network topology comprises multiple potential paths to the sender node, and wherein multiple network elements are shared between at least two of the multiple network topologies;

reserving reservation states for the TE LSP, wherein the reserving reservation states comprises sending a second RSVP-TE message at layer two containing multi-topology information comprising a multi-topology identification and a multi-topology identification metric about the single network topology traversed by the TE LSP at layer two among the multiple network topologies in the single network, and wherein the second RSVP-TE message travels a reverse path identical to a forward path traveled by the first RSVP-TE message; and releasing the reserved reservation states.

9. The method of claim 8, further comprising providing reservation state information to network elements.

10. The method of claim 8, wherein the second RSVP-TE message comprises a RSVP-TE Resv message.

11. The method of claim 10, wherein the multi-topology information is contained within the RSVP-TE Resv message.

12. The method of claim 10, wherein the multi-topology information is contained within a RSVP-TE object.

13. The method of claim 8, wherein the second RSVP-TE message comprises a capability field, wherein the capability field contains an indicator that indicates if an originator of a message is capable of supporting multi-topology networks.

14. The method of claim 8, wherein releasing the reserved path states comprises sending a RSVP-TE ResvTear message, the RSVP-TE ResvTear message comprising the multi-topology information.

15. A multi-topology, multi-protocol label switching (MPLS) network using resource reservation protocol with traffic engineering (RSVP-TE) comprising:

a plurality of network elements coupled together with a number of links, the plurality of network elements arranged into two or more network topologies having multiple network elements shared between two of the network topologies, each network element comprising a session manager configured to establish traffic engineered label switched paths (TE LSPs) at layer two; and wherein the network elements are configured to use a RSVP-TE message at layer two containing multi-topology information comprising a multi-topology identification and a multi-topology identification metric about network topologies traversed by the TE LSPs at layer two among multiple network topologies in a single network to establish the TE LSPs, wherein each TE LSP is established within a single network topology comprising multiple potential paths between respective sender and receiver nodes.

16. The network of claim 15, wherein the session manager comprises a first session create unit coupled to other network elements in the plurality of network elements, the first session create unit configured to transmit RSVP-TE Path messages or RSVP-TE Resv messages to establish a respective TE LSP within the single network topology, wherein the RSVP-TE Path messages and the RSVP-TE Resv messages comprise multi-topology information.

17. The network of claim 15, wherein the session manager further comprises a first session teardown unit coupled to the first session create unit, the first session teardown unit configured to transmit RSVP-TE PathTear messages or RSVP-TE ResvTear messages to teardown a respective TE LSP within the single network topology, wherein the RSVP-TE PathTear messages and the RSVP-TE ResvTear messages comprise the multi-topology information.

18. The network of claim 16, wherein the session manager further comprises a first state status unit coupled to the first session create unit, the first state status unit configured to transmit RSVP-TE PathErr messages, RSVP-TE ResvErr messages, or RSVP-TE ResvConf messages to provide state status information to network elements in the plurality of network elements, wherein the RSVP-TE PathErr messages, the RSVP-TE ResvErr messages, and the RSVP-TE ResvConf messages comprise the multi-topology information.

19. The network of claim 15, wherein the session manager comprises a second session create unit coupled to other network elements in the plurality of network elements, the second session create unit configured to transmit RSVP-TE Path messages or RSVP-TE Resv messages to establish a respective TE LSP, wherein the RSVP-TE Path messages and the RSVP-TE Resv messages comprise the multi-topology information contained within a first RSVP-TE object.

20. The network of claim 19, wherein the session manager further comprises a second session teardown unit coupled to the second session create unit, the second session teardown unit configured to transmit RSVP-TE PathTear messages or RSVP-TE ResvTear messages to teardown the respective TE LSP, wherein the RSVP-TE PathTear messages and the RSVP-TE ResvTear messages comprise the multi-topology information contained within a second RSVP-TE object.

21. The network of claim 19, wherein the session manager further comprises a second state status unit coupled to the second session create unit, the second state status unit configured to transmit RSVP-TE PathErr messages, RSVP-TE ResvErr messages, or RSVP-TE ResvConf messages to provide state status information to network elements in the plurality of network elements, wherein the RSVP-TE PathErr messages, the RSVP-TE ResvErr messages, and the RSVP-TE ResvConf messages comprise the multi-topology information contained within a third RSVP-TE object.

22. The network of claim 15, wherein messages are transmitted in the network, and wherein each message comprises a capability field, wherein the capability field contains an indicator that indicates if an originator of a message is capable of supporting multi-topology networks.

* * * * *